US007970796B1

(12) United States Patent
Narayanan

(10) Patent No.: US 7,970,796 B1
(45) Date of Patent: Jun. 28, 2011

(54) METHOD AND SYSTEM FOR IMPORTING DATA TO A REPOSITORY

(75) Inventor: Najeeb T. Narayanan, Kerala (IN)

(73) Assignee: Intuit Inc., Mountain View, CA (US)

( * ) Notice: Subject to any disclaimer, the term of this patent is extended or adjusted under 35 U.S.C. 154(b) by 532 days.

(21) Appl. No.: 11/607,390

(22) Filed: Dec. 1, 2006

(51) Int. Cl.
*G06F 17/30* (2006.01)
*G06F 7/00* (2006.01)
*G06F 9/44* (2006.01)
*G06F 9/445* (2006.01)

(52) U.S. Cl. ...................... 707/802; 717/174; 717/110
(58) Field of Classification Search ...... 707/1; 717/174, 717/110
See application file for complete search history.

(56) References Cited

U.S. PATENT DOCUMENTS

| 5,974,413 | A  | * | 10/1999 | Beauregard et al. ............ 707/6 |
| 6,988,241 | B1 | * | 1/2006  | Guttman et al. ............ 715/220 |
| 7,401,094 | B1 | * | 7/2008  | Kesler ............ 707/805 |
| 7,472,339 | B2 | * | 12/2008 | Bauchot ............ 715/214 |
| 2002/0052791 | A1 | * | 5/2002  | Defede et al. ............ 705/16 |
| 2002/0111888 | A1 | * | 8/2002  | Stanley et al. ............ 705/31 |
| 2002/0147739 | A1 | * | 10/2002 | Clements et al. ............ 707/500 |
| 2005/0138057 | A1 | * | 6/2005  | Bender et al. ............ 707/102 |
| 2006/0101013 | A1 | * | 5/2006  | Kenney et al. ............ 707/4 |
| 2006/0101046 | A1 | * | 5/2006  | Hargarten et al. ............ 707/101 |
| 2007/0041041 | A1 | * | 2/2007  | Engbrocks et al. ............ 358/1.15 |
| 2007/0208765 | A1 | * | 9/2007  | Li et al. ............ 707/101 |
| 2007/0245339 | A1 | * | 10/2007 | Bauman et al. ............ 717/174 |

* cited by examiner

*Primary Examiner* — Pierre M Vital
*Assistant Examiner* — Sabana Rahman
(74) *Attorney, Agent, or Firm* — Osha • Liang LLP

(57) ABSTRACT

A method for importing data from a document to a repository, involving selecting data from a document, mapping the selected data to a pre-defined field in the repository using a context menu, wherein the context menu is dynamically created using a map file for mapping data associated with the document to a plurality of pre-defined fields in the repository, and importing the selected data from the document to the repository using the map file.

23 Claims, 6 Drawing Sheets

METHOD AND SYSTEM FOR IMPORTING DATA TO A REPOSITORY

BACKGROUND

Typically, businesses that provide services to customers keep track of information, such as customer information, purchase price, quantity purchased, etc., using financial software, e.g., personal or commercial accounting software. Further, businesses also keep track of vendor information and employee information, such as vendor name, vendor address, employee identification number, etc. The aforementioned information is tracked for accounting purposes so that businesses have a record of services provided, employee information, and can calculate profit, loss, etc. Further, tracking information in this manner allows the accounting software to generate reports that present the tracked information in various ways. In addition, the tracked information may be used by the business when filing compliance documents, such as tax documents, regulatory forms, benefits forms, or other business compliance forms.

The accounting software typically includes fields of information, such as a name, a date, a "to" address, a "from" address, a description of a purchased item, a quantity of items purchased, employee identification, etc. The data corresponding to each field of information in the financial software is typically manually entered using information on invoices, purchase orders, employee paychecks, employee time sheets, or other documents that include information related to services provided by the business. That is, the fields of information associated with the financial software are populated manually, either on the customer's end or on the business's end.

SUMMARY

In general, in one aspect, the invention relates to a method for importing data from a document to a repository, comprising selecting data from a document, mapping the selected data to a pre-defined field in the repository using a context menu, wherein the context menu is dynamically created using a map file configured to map data associated with the document to a plurality of pre-defined fields in the repository, and importing the selected data from the document to the repository using the map file.

In general, in one aspect, the invention relates to a computing device for importing data into a repository, comprising a document comprising data, and a map file configured to map data from the document to a plurality of fields in the repository, wherein the map file is used to dynamically create a context menu in the document, wherein the context menu comprises the plurality of fields corresponding to the repository, and wherein data in the document selected by a user is associated with one of the plurality of fields using the context menu.

In general, in one aspect, the invention relates to a user interface, comprising a document loaded in a corresponding document application, wherein the document comprises at least one portion of data, and a context menu comprising at least one information field corresponding to a repository, wherein the content menu is dynamically created within the document application, wherein the at least one portion of data is selected by a user, and wherein the context menu is used to map the at least one portion of selected data to the at least one information field.

In general, in one aspect, the invention relates to a computer usable medium comprising computer readable program code embodied therein for causing a computer system to select data from a document, map the selected data to a pre-defined field in a repository using a context menu, wherein the context menu is dynamically created using a map file configured to map data associated with the document to a plurality of pre-defined fields in the repository, and import the selected data from the document to the repository using the map file.

In general, in one aspect, the invention relates to a computer system, comprising a processor, a memory, a repository, and software instruction stored in the memory for enabling the computer system under control of the processor to select data from a document, map the selected data to a pre-defined field in the repository using a context menu, wherein the context menu is dynamically created using a map file configured to map data associated with the document to a plurality of pre-defined fields in the repository, and import the selected data from the document to the repository using the map file.

Other aspects of the invention will be apparent from the following description and the appended claims.

DETAILED DESCRIPTION

Figure 1:
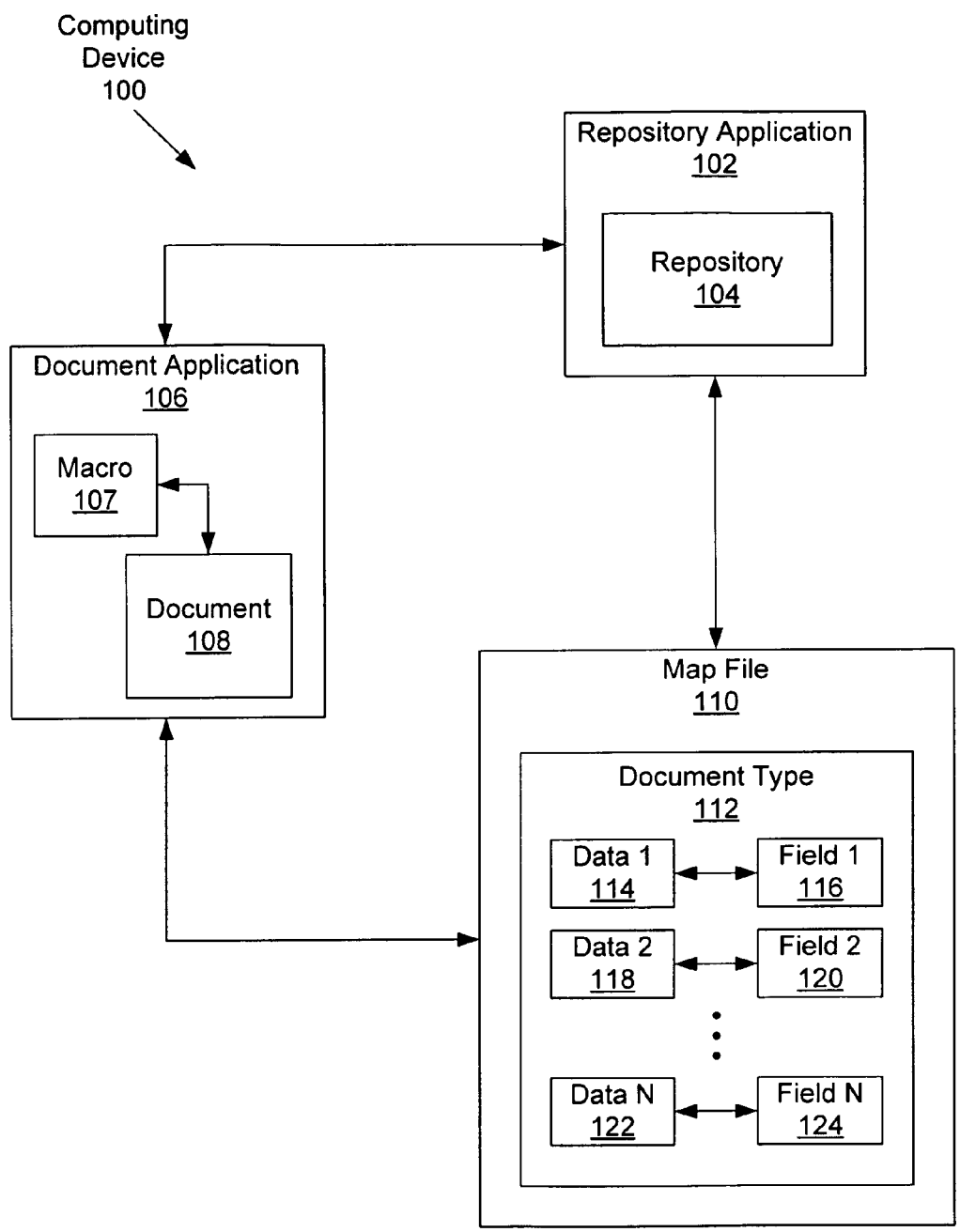
FIG. 1 shows a system for importing data to a repository in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for importing data into a database. Specifically, embodiments of the invention provide a method for mapping data from documents into a financial software. More specifically, embodiments of the invention map data from documents to fields within the financial software using a map file.

FIG. 1 shows a system for importing data into a database in accordance with one or more embodiments of the invention. Specifically, FIG. 1 shows a computing device (100) comprising a repository application (102), a document application (106), and a map file (110). Further, the repository application (102) includes a repository (104), and the document application (106) includes a document (108) and a macro (107). Each of the aforementioned components of FIG. 1 is described below.

In one or more embodiments of the invention, the computing device (100) may be a computer system, a server, a handheld electronic device, a media device, etc. The computing device (100) executes a repository application (102). In one or more embodiments of the invention, the repository application (102) may be any software that includes functionality to store data. For example, the repository application (102) may be business financial software (such as accounting software), personal financial software, such as Money® or Quicken® (Money is developed by and a trademark of Microsoft Corporation, headquartered in Redman, Wash.; Quicken is developed by and a trademark of Intuit, Inc., headquartered in Mountain View, Calif.), or any other application that may be used to keep track of data imported from a document (108). For example, the repository application may simply be a database application configured to store data. In one embodiment of the invention, the repository application is QuickBooks® (QuickBooks is developed by and a trademark of Intuit, Inc., headquartered in Mountain View, Calif.), and in other embodiments the repository application may be an accounting software, a database, or an application capable of storing and tracking data imported from a document (108).

Further, in one or more embodiments of the invention, the repository application (102) includes a repository (104) for storing the data imported from the document (108). In one embodiment of the invention, the repository may be a database specifically associated with the repository application (102). Further, the repository (104) is configured to store one or more information fields corresponding to portions of imported data. For example, in one embodiment of the invention, information fields may be customer name, date, employee identification number, time, quantity, price, item name, item description, etc.

In one or more embodiments of the invention, the repository application (102) may be used to keep track of data that may used to generate and/or complete relevant documents. For example, the data stored in the repository (104) associated with the repository application (102) may be used to generate and/or complete tax documents, medical/healthcare documents, business organization documents, insurance documents, accounting documents, etc. In one or more embodiments of the invention, the data stored in the repository (104) is used to keep a record of the transactions performed by one or more businesses that provide goods/services to customers for accounting purposes. For example, the record of transactions performed by businesses may be used to generate financial documents for the businesses, such as balance sheets, income statements, etc. Alternatively, the repository (104) may be used to store data for any purpose. For example, a user wishing to combine information from multiple documents may simply import relevant data from each document into the repository (104). Alternatively, data may be imported into the repository (104) for presentation purposes, i.e., to generate a report displaying relevant information.

Those skilled in the art will appreciate that information fields recognized by the repository application (102) and stored in the repository (104) may be categorized by one or more types of documents. That is, one or more information fields may correspond to a particular type of document (discussed below). Further, those skilled in the art will appreciate that the repository (104) may be located external to the repository application (102), where the repository application (102) is operatively coupled to the repository (104).

In one or more embodiments of the invention, the document application (106) may be any application used to open, read, and edit documents. For example, the document application may be a word processing application, a presentation application, a spreadsheet application, a publishing application, a form-based application, etc. In one or more embodiments of the invention, the document application (106) used to import data from the document (108) may depend on a type of the document (108). For example, if the document from which data is imported in an invoice document, then the document application used to open the invoice document may be a word processing application or a form-based application. Alternatively, if the data to be imported is stored in a spreadsheet document, then the document application used to load and select data to be imported into the repository may be a spreadsheet application.

As described above, the document (108) may be any document from which data may be imported into the repository (104). For example, a document may be any type of receipt for received or purchased goods/services (i.e., an invoice, a purchase order, etc.), an employee paycheck/paystub, an employee timesheet, or any other document from which information may be tracked by an individual or a corporation. In one or more embodiments of the invention, the relevant data imported into the repository (104) is defined by the type of the document (108). For example, if the document (108) is an invoice, then the shipping address, the date, the customer name, item(s) name, the quantity of item(s) purchased, and the price of the item(s) purchased are all relevant data that may be imported into the repository (104). Alternatively, if the document (108) is an employee timesheet, the relevant data imported into the database may be employee identification number, date, and the total time for each date.

Continuing with FIG. 1, the document application (106) includes a macro (107). A macro (107) is an object that represents a list of commands, actions, or keystrokes that may be performed by the document application. In one or more embodiments of the invention, the macro (107) is used to access the map file (110) from the document application (106) when the document (108) from which data is to be imported is loaded. Said another way, the macro (107) contains commands configured to access the map file (110), determine the information fields corresponding to the type of document (108) loaded in the document application (106) from the map file, and dynamically create a context menu (not shown) containing the information fields from the map file (110). Further, in one embodiment of the invention, the macro (107) corresponds to the document application (106). That is, different macros may be written and stored in the repository application (102) for different document applications. In this manner, macros may be customized for spreadsheet applications, word processing applications, etc. In one embodiment of the invention, the macro (107) may be stored in the repository application (102) and/or the repository (104) until the document application (106) and/or the document (108) is loaded by a user.

As mentioned above, the macro (107) is used to dynamically create a context menu within the document application (106). In one or more embodiments of the invention, the context menu is a user interface that allows the user to select the information field(s) corresponding to various portions of data in the document (108). For example, if the document is an invoice, then the context menu dynamically created for the invoice document may include the information fields relevant to an invoice document (e.g., date, quantity purchased, name of item(s) purchased, etc.). The information fields are added to the context menu, and the context menu is used by a user to map selected portions of data within the document to one or more of the information fields. In one embodiment of the invention, the context menu may be a drop-down menu, a pop-up dialog box, a toolbar that is added to the document application dynamically, or any other type of user interface from which information fields may be selected. Further, in one embodiment of the invention, the context menu may be a modified version of an existing menu in the document application. For example, in one embodiment of the invention, the context menu may be a modified version of the edit menu already present in a typical word processing application.

Returning to FIG. 1, the map file (110) is a file stored within the computing device (100) that is accessible by the repository application (102) and the document application (106) (i.e., via the macro (107)). In one embodiment of the invention, the map file (110) is stored in a directory location, such as in a template directory, on the computing device (100). Those skilled in the art will appreciate that the map file (110) may be stored anywhere on the computing device (100). Further, the repository application (102) is provided with the path of the location of the map file (102). The macro (107) is also provided with a link to access the map file (110), which is used by the macro (107) to dynamically create the context menu.

Continuing with FIG. 1, in one embodiment of the invention, the map file (110) includes mappings between one or more information fields (i.e., Field 1 (116), Field 2 (120), Field N (124)) required and recognized by the repository application (102), and portions of data (i.e., Data 1 (114), Date 2 (118), Data N (112)) from a particular document type (112). More specifically, the map file (110) shown in FIG. 1 maps Data 1 (114) to Field 1 (116), Data 2 (118) to Field 2 (120), and Data N (112), to Field N (124), where Data 1 (114), Data 2 (118), and Data N (122) are portions of data selected from document type (112). As explained above, the document type (112) corresponds to a particular type of document, such as an invoice, an employee timesheet, an employee paycheck, or other types of documents. Consider the scenario in which the document type (112) is an employee paycheck. In this case, Data 1 (114) may be the employee's name, which is mapped to the information field (Field 1 (116)) labeled "Employee Last Name." Similarly, Data 2 (118) may represent the employee's income, mapped to the information field (Field 2 (120)) labeled "Net Income," and Data N (122) may be the employee's identification number, mapped to the information field (Field N (124)) labeled "Employee Payroll Number."

Those skilled in the art will appreciate that a different map file for each document type (112) may exist. That is, the map file associated with an invoice may be separate and distinct from the map file associated with an employee timesheet. This is because each document type (112) requires different information fields that map to the repository application (102). For example, an employee timesheet requires an information field that represents the employee's identification number, where as an invoice does not require such an information field. Because the map file contains all the mappings between relevant portions of data in each document type and the corresponding information fields, there may be a separate map file for each document type from which data is imported into the repository.

In one embodiment of the invention, the following text is an example of the contents of a map file that maps data extracted from an invoice document (using a word processing application) to relevant information fields associated with an invoice. In particular, the map file example shown below maps data from an invoice to the following information fields: i) "from" address; ii) "to" address; iii) date; iv) invoice content; and v) company name.

[INDEX0]
QBName=From Address
WORDField=Najeeb at Intuit Technology Services
[INDEX1]
QBName=To Address
WORDField=The Manger at XX Systems
[INDEX2]
QBName=Date
WORDField=25-4-2006
[INDEX3]
QBName=Invoice Content
WORDField=Quick Books Pro, Turbo Tax Professional
[INDEX4]
QBName=Company
WORDField=XX Systems In the example above, each QBName represent a QuickBooks® information field associated with an invoice document. Further, each WORDField represents the data extracted from the invoice document. Thus, for example, the information field "Company" is populated with data from the invoice that represents the name of the company that purchased the items listed as the invoice content, which in this example is "XX Systems." Similarly, the "Invoice Content" information field is populated with the names of the items purchased by XX Systems, which, in this example, are Quick Books Pro and Turbo Tax Professional.

Those skilled in the art will appreciate that the aforementioned example represents one way to organize the content of a map file and is not meant to limit the format or content of the map file in any way. A map file may be in any format and organized in any manner that allows for particular information fields to be mapped to relevant content extracted from a document type for which the map file is written. For example, those skilled in the art will appreciate that a map file associated with a spreadsheet document, where data to be extracted is organized by column and row may be organized and formatted differently from the example map file above.

Figure 2:
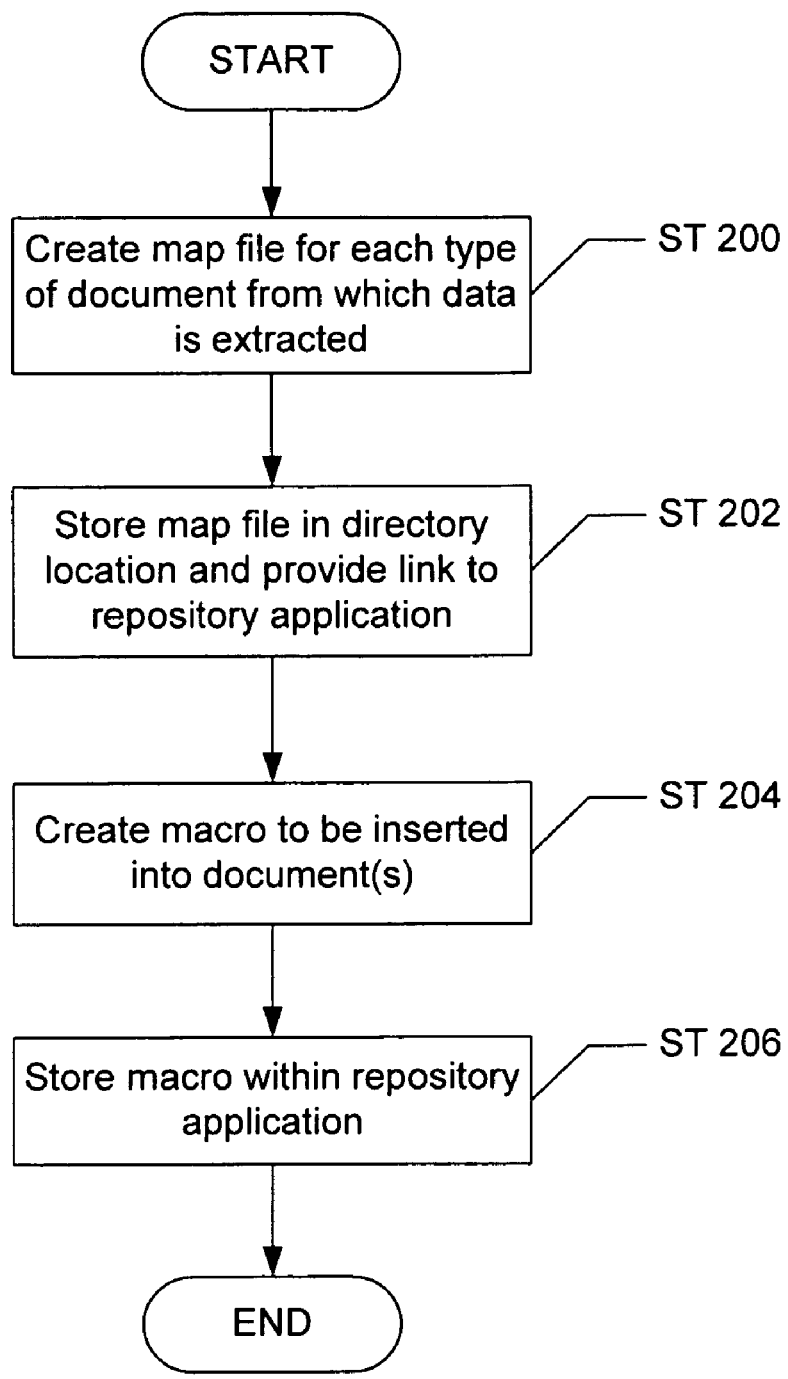
FIG. 2-4 show flow charts for importing data to a repository in accordance with one or more embodiments of the invention.

FIG. 2 shows a flow chart for setting up the ability to import data into a repository in accordance with one or more embodiments of the invention. Initially, one or more map files are created (Step 200). In one or more embodiments of the invention, a map file is created for each document type from which data is imported. For example, a separate map file is created for an invoice, a purchase order, an employee timesheet, etc. As described above, a map file maps data from particular types of documents to information fields corresponding to the repository and/or repository application. A individual map file is created for each document type because the information fields corresponding to the repository vary for each document type. For example, the information fields relevant in an invoice may be price purchased, quantity purchased, a shipping address, a customer name, etc. In contrast, the information fields relevant in an employee timesheet may be an employee number, an employee name, the date, etc.

Subsequently, the created map file(s) are stored in a directory and the directory location (i.e., the directory path) is provided to the repository application (Step 202). For example, in one embodiment of the invention, the map file(s) may be stored in a templates directory. Those skilled in the art will appreciate that the map file(s) may be stored anywhere within the computing system. At this stage, a macro is created for insertion into the document application (Step 204). In one or more embodiments of the invention, the macro is used to access the map file in its directory location, look up the relevant information fields stored within the map file for the particular document type that is loaded via the document application, and dynamically create a context menu for importing selected data within a document (described below).

Further, in one or more embodiments of the invention, the macro is dynamically injected into the document application when the document application is loaded from the repository application. That is, the macro is created and subsequently stored in the repository application for insertion into the document application (Step 206). Those skilled in the art will appreciate that different macros may be written for each document application type. For example, different macros may be written for word processing applications, presentation applications, spreadsheet applications, etc.

Figure 3:
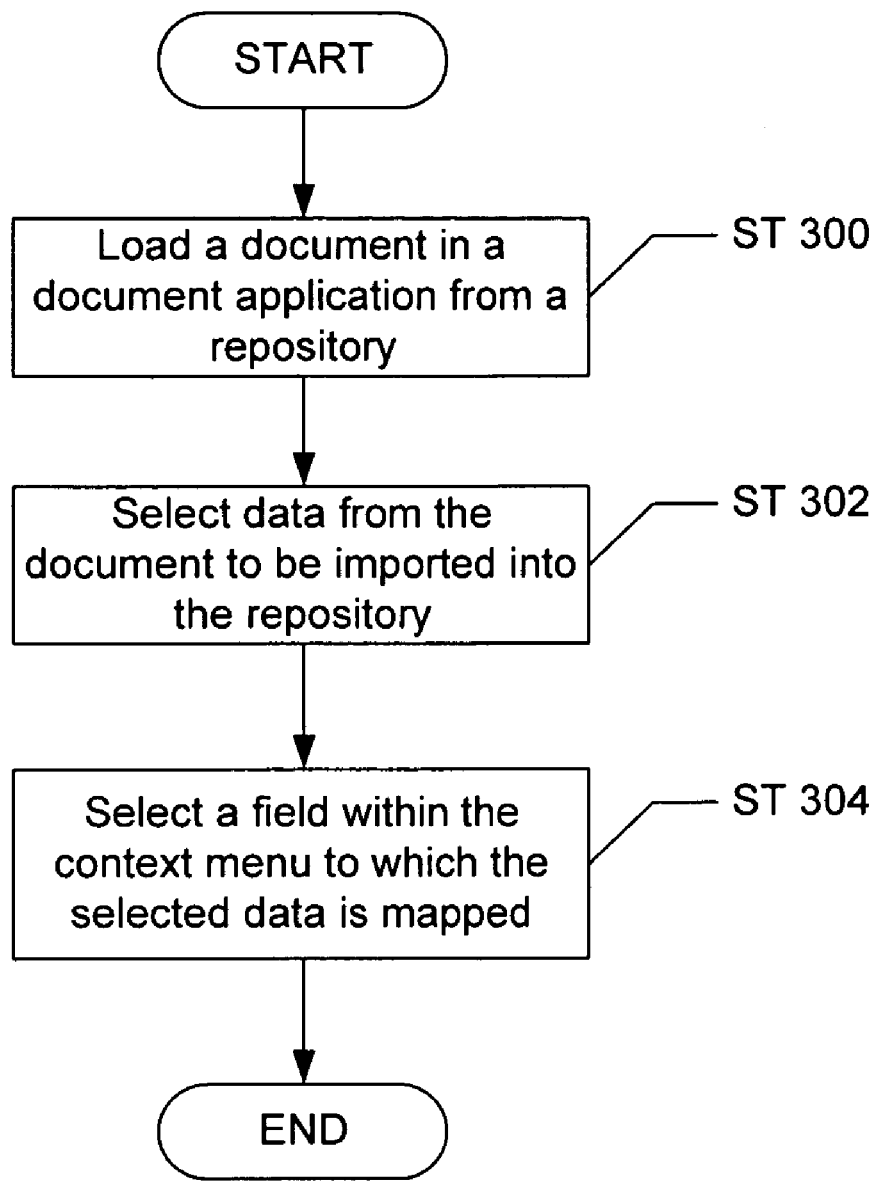

Upon creating and storing the map file and the macro, data is imported into the repository using the process shown in FIG. 3. FIG. 3 shows a flow chart for importing data into a data base in accordance with one or more embodiments of the invention. More specifically, FIG. 3 shows the process of importing data into a repository from the user's perspective. Initially, a document from which data is to be imported is loaded (Step 300). Particularly, in one or more embodiments of the invention, the document from which data is imported is loaded in a corresponding document application via the repository application. For example, if the repository application is business financial software, then a user may load an invoice document from the business financial software in a word processing or form-based application. Upon loading a document, a user may select particular portions of data for importing into the repository (Step 302). In one embodiment of the invention, particular portions of data may be selected by highlighting the data, inserting a comment around the data, changing the color of the data, etc. Lastly, to complete the importation process from the perspective of a user, the user selects a particular information field from a context menu, where the selected data is mapped to the information field selected from the context menu. In one embodiment of the invention, the user invokes the context menu by right-clicking on the selected data.

Those skilled in the art will appreciate that the context menu may be invoked in other ways, such as by using a toolbar that includes information fields corresponding to the repository, etc. Further, as described above, the context menu includes the information fields corresponding to the repository that apply specifically to the document type from which data is being imported. That is, particular information fields that are specific to the document type that is loaded by the user are presented to the user in the context menu, and the user may select the information field that correctly maps to the selected data.

For example, suppose the user loads an invoice document in a word processing application via business financial software. In this case, the user may select the customer name and the shipping address to be imported into a repository. The context menu dynamically created for an invoice document may include, for example, information fields such as "shipping address," "customer name," "date," "name of the good purchased," "price of goods purchased," and "quantity of goods purchased." If the user selects the shipping address by highlighting the customer's address on the invoice document, right-clicks on the selected shipping address, and chooses "shipping address" from the context menu, then the selected data is mapped to the information field "shipping address," and the address selected in the invoice is imported into the "shipping address" field of the business financial software repository.

Those skilled in the art will appreciate that the user may map several portions of data in a particular document to different information fields selected via the context menu. Alternatively, the user may map more than one portion of data to the same information field. Further, in one embodiment of the invention, the context menu may be modified by the user (if the user is given permissions to modify the context menu) to include additional information fields corresponding to the repository.

Figure 4:
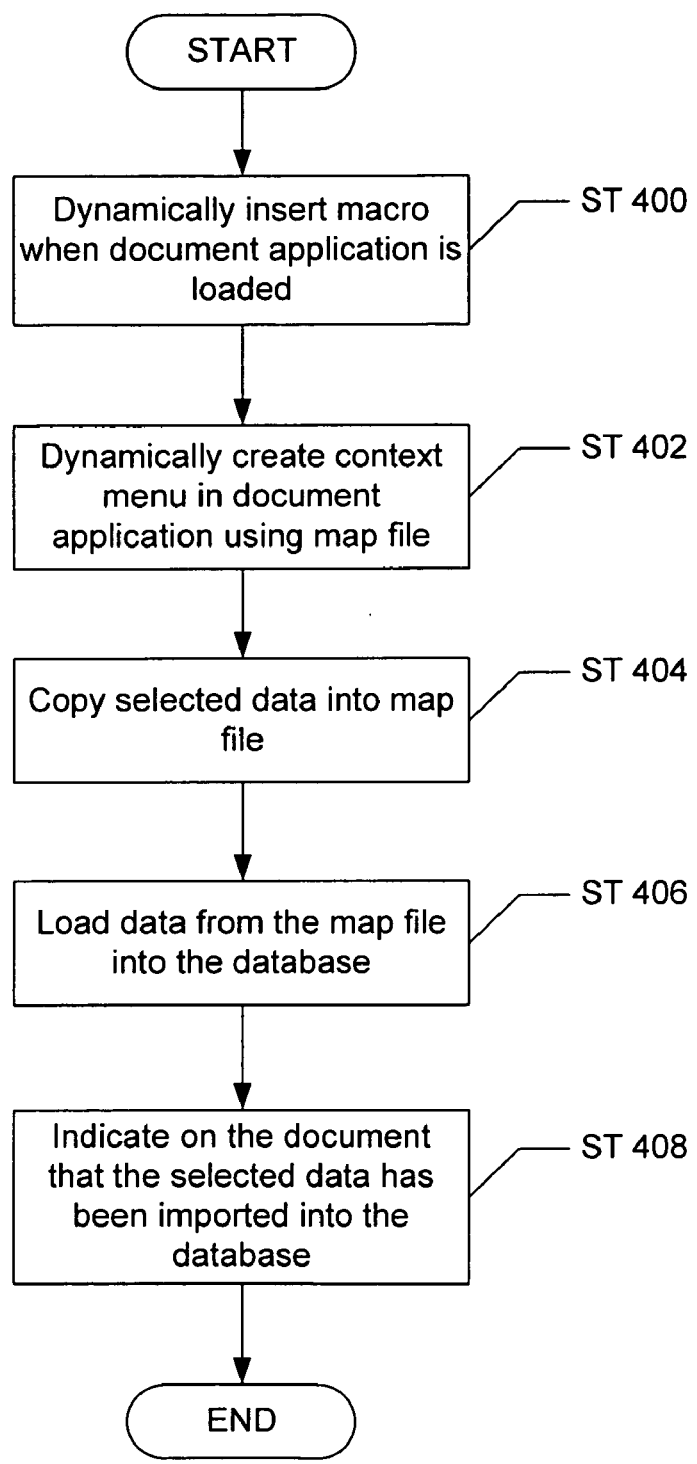

FIG. 4 shows a flow chart for importing data into a repository in accordance with one or more embodiments of the invention. More specifically, FIG. 4 shows the process of importing data into a repository from the backend perspective. Initially, in one or more embodiments of the invention, when the document application and document are loaded from the repository application, a macro is dynamically inserted into the document application (Step 400). The repository application inserts the macro into the document application. In one embodiment of the invention, because the document from which data is imported is loaded from the repository application, the repository application automatically inserts the macro into the document application corresponding to the document that loads from the repository application.

Subsequently, when the macro is executed within the document application, a context menu is dynamically created (Step 402). In one or more embodiments of the invention, the macro reads the format of the map file and dynamically creates the context menu within the document application. Further, the context menu presents the information fields that correspond to the repository application for user selection. When the user selects data to be imported from a document and uses the context menu to map the selected data to an information field presented by the context menu, the selected data is copied into the map file (Step 404). In one or more embodiments of the invention, the selected data that is copied into the map file is subsequently loaded into the repository through the repository application (Step 406). Particularly, in one embodiment of the invention, because the repository application includes the location of the map file, the repository application includes functionality to import the data copied into the map file and store the data in the repository. Finally, in one or more embodiments of the invention, when selected data is copied to the map file and imported into the repository, a comment is inserted into the document indicating to the user that the selected data has been imported into the database (Step 408).

Those skilled in the art will appreciate that the comment may be inserted in any form, including a pop-up notice, a pull-up/pull-down menu, a comment feature provided within the document application, or any other notification that indicates certain portions of data have been imported, such as changing the color of imported data, making the imported data a smaller or larger size, fading the imported data, etc.

Figure 5:
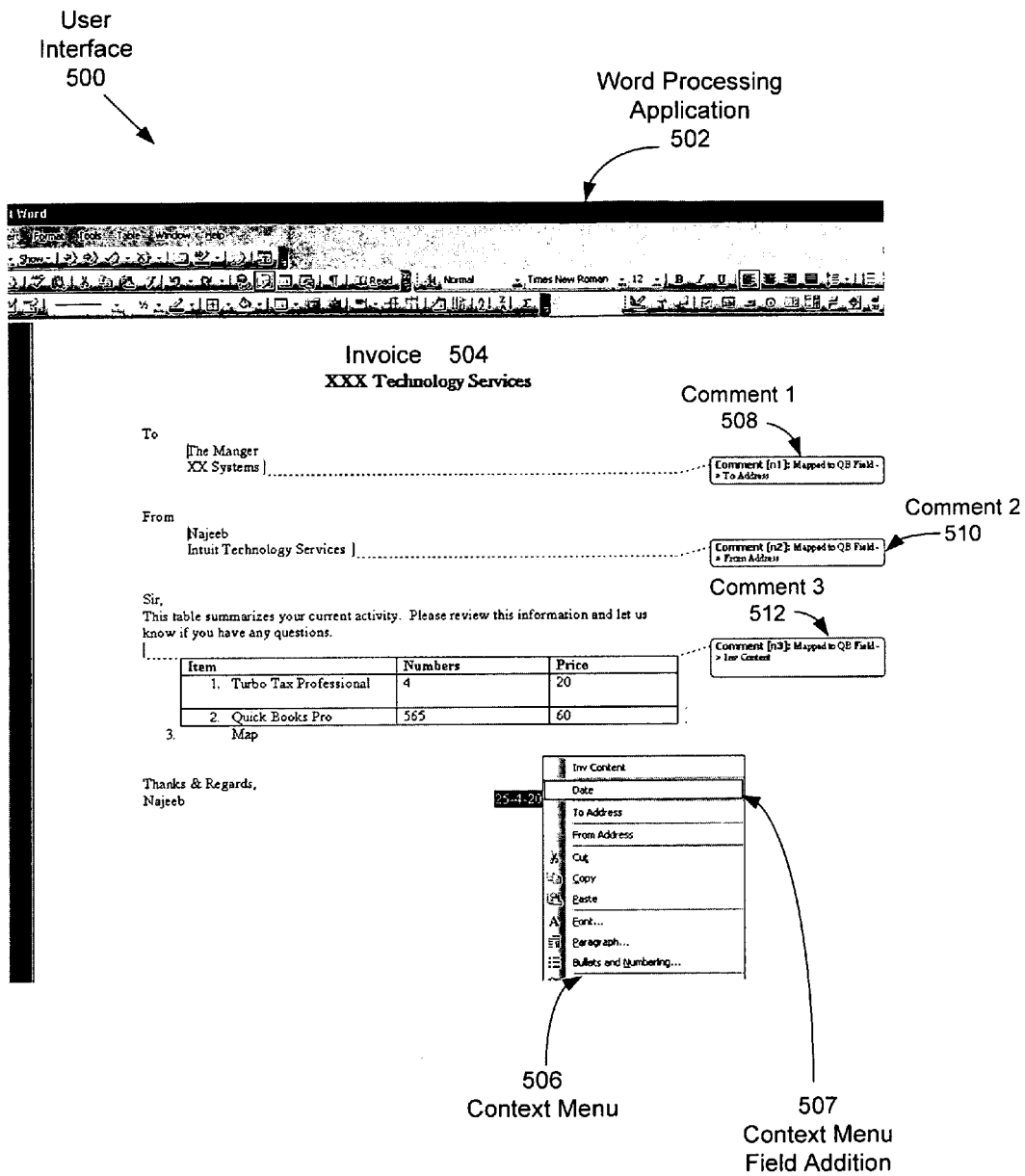
FIG. 5 shows a user interface for importing data into a repository in accordance with one or more embodiments of the invention.

FIG. 5 shows an example of importing data into a repository in accordance with one or more embodiments of the invention. Particularly, FIG. 5 shows a user interface (500) including a word processing application (502), an invoice document (504), a context menu (506), and multiple comments (Comment 1 (508), Comment 2 (510), Comment 3 (512)). Further, as shown in FIG. 5, the invoice includes data such as the names of products purchased (i.e., Turbo Tax, QuickBooks Pro), the quantity of the items purchased (i.e., 4 and 565, respectively), and the price of the purchased products (i.e., 20 and 60, respectively). Further, the invoice includes a to address, a from address, and a date.

As described above with respect to FIG. 3, a user loads the invoice (504) from a repository application. The invoice (504) is subsequently loaded within the word processing application (502). At this stage, the macro (stored within the repository application) is loaded into the word processing application (102), which accesses the map file associated with the invoice (504) and dynamically creates the context menu (506), shown in FIG. 5. FIG. 5 shows the context menu as an enhanced version of a typical word processing menu that is displayed when the selected data is right-clicked. In this case, the example shows a highlighted date. Because the information field "date" is one that is stored in the map file for an invoice document, the information field "date" is a context menu field addition (507) and is displayed in the context menu (506). In addition, as shown in the context menu (506) an invoice is also associated with information fields "to address" and "from address" which also appear in the dynamically created context menu (506).

Continuing with FIG. 5, as shown, the invoice data associated with Comment 1 (508) (i.e., the "to address"), Comment 2 (510) (i.e., the "from address"), and Comment 3 (512) (i.e., the invoice item, numbers, and price) have already been imported into a repository. As described above, once data is imported, a comment may be added to the document, indicating that the commented data has already been imported into the repository. Upon importing the highlighted date, all the relevant information fields associated with the invoice (504) are imported, and the invoice document can be closed.

Those skilled in the art will appreciate that upon selecting the date information field (507) from the context menu (506), the date is copied into the map file associated with the invoice (504). Subsequently, a repository application may obtain the date from the map file, and the date is imported into the repository associated with the repository application.

As described above, data may be imported from a spreadsheet document, such as an Excel® document (Excel is as registered trademark of Microsoft Corporation, headquartered in Redman, Wash.). The following is an example scenario that describes how data may be imported from a spreadsheet document in accordance with one or more embodiments of the invention.

In a spreadsheet document, data is typically organized by columns and rows. In one embodiment of the invention, data is imported from a spreadsheet document using a script that executes a best-match algorithm that matches the column and/or row names within the spreadsheet document and the information fields stored in the repository application. For example, suppose a spreadsheet document included columns labeled "First Name," "Last Name," "Date Sent," and "Product Name." Suppose further that the spreadsheet document includes similar information to an invoice document, i.e., the map file for the spreadsheet document is the same as the map file for an invoice document. The invoice document is associated with an information field "Customer Name." In this case, because there is no column labeled "Customer Name," the best-match algorithm would match both the "First Name" column and the "Last Name" column to the "Customer Name" information field corresponding to the repository application. Thus, both columns "First Name" and "Last Name" would be imported into the "Customer Name" information field. Similarly, the "Date Sent" column would be matched with the "Date" information field, because "Date Sent" is a close match to the information field "Date."

In one embodiment of the invention, if the script is unable to find a best-match for one or more of the column names in the spreadsheet document, then an attribute of the one or more columns may be changed to indicate that the user must select the column and using a dynamically created context menu to select the appropriate information field(s) corresponding to the repository application for each column/row name. For example, the attribute change may be a change in color of the column, a change in font/size of the text in the non-imported column, an insertion of a comment for the non-imported column, or any other appearance change for the columns for which a best-match could not be found.

Continuing with the example above, suppose the column labeled "Product Name" does not match any of the information fields within the map file associated with the spreadsheet document. In this case, an attribute of the column labeled "Product Name" may be changed by the best-match script so that the user is aware that the data from the column "Product Name" was not imported automatically into the repository application. In this case, the user may select the column "Product Name" and use a dynamically created context menu to select the information field that best corresponds to the data stored in the column "Product Name." For example, "Produce Name" may be matched to information field "Invoice Content." Upon matching the columns that remain after the automated best-match algorithm has completed a pass-through of the spreadsheet document, the user can import all the necessary data from the spreadsheet document into a repository associated with a repository application. Subsequently, the imported data may be used to generate reports, generate documents, complete documents to be filed with government bodies or documents to be presented to others, etc. Alternatively, the data may be imported into the repository only for storage purposes to reduce the number of documents that need to be saved. By importing relevant data from documents into one location within a repository application, the documents no longer need to be kept, thereby reducing the amount of paper saved by businesses and individuals.

Using the scripted method described above for spreadsheet documents, the user does not have to manually select information fields corresponding to each column or row name. The script automatically imports data from each column/row when a best-match is found for the information field that corresponds to each column/row name. Those skilled in the art will appreciate that while the aforementioned example describes using an automated best-match script for spreadsheet documents, the best-match script may be used to import data in word processing documents, presentation documents, form-based documents, publishing documents, or any other type of document.

Figure 6:
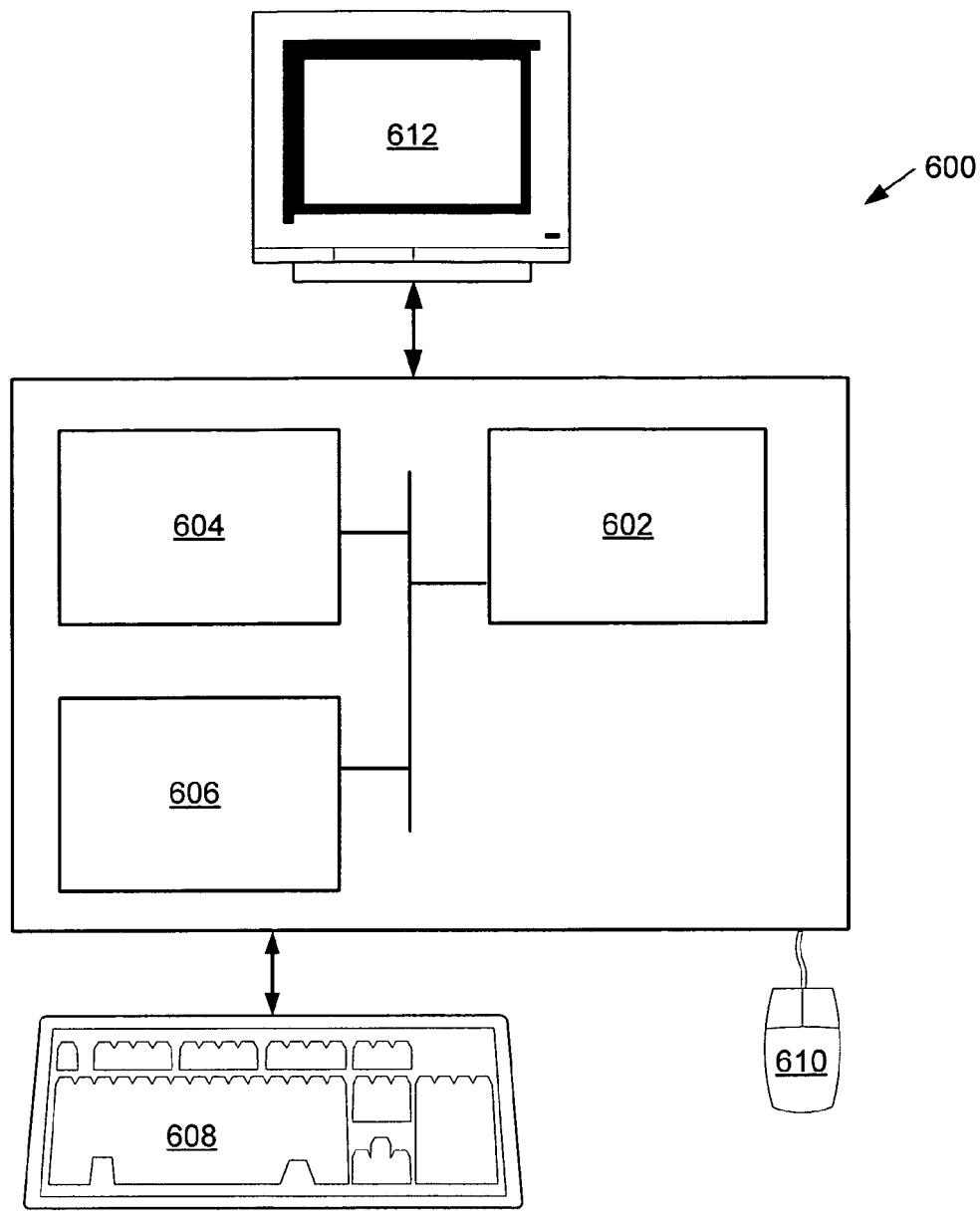
FIG. 6 shows a computer system in accordance with one or more embodiments of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms, now known or later developed. Further, software instructions to perform embodiments of the invention may be stored on any tangible computer readable medium such as a compact disc (CD), a diskette, a tape, or any other tangible computer readable storage device.

Embodiments of the invention provide a method and system for importing data into a repository without manually entering data from documents into an electronic medium. Thus, embodiments of the invention reduce the amount of labor necessary to copy data from relevant business documents into one location. The imported data may subsequently be used to generate, complete, and/or file reports/documents. In addition, the imported data is stored in one location, making it easier to access and provide data to others when necessary.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for importing data from a document to a repository, comprising:
creating a map file corresponding to a document type of the document, wherein the map file maps the document type of the document to a plurality of information fields stored in the repository for the document type;
storing the map file in a directory and providing a location of the directory to the repository;
selecting data from the document;
creating a macro for the document, wherein the macro is dynamically inserted into the document from which data is imported when the document is loaded from the repository, and wherein the macro is configured to:
access the map file at the directory location stored in the repository,
determine the plurality of information fields corresponding to the document type of the document from which data is imported from the map file, and
dynamically create a context menu, in response to the selection of data, comprising the plurality of information fields, wherein the context menu is a user interface that is created using the map file,
wherein the macro is specific to a document application in which the document is loaded;
mapping the selected data to one of the plurality of fields in the repository by selecting the one of the plurality of information fields displayed in the context menu;
inserting a comment into the document by a user importing the data, wherein the comment indicates that the selected data is imported into the repository; and
importing the selected data from the document to the selected information field in the repository using the map file, wherein the selected data is copied to the map file, which acts as an intermediary storage file between the document and the repository, until the stored selected data is loaded from the map file into the repository at a later time.

2. The method of claim 1, further comprising:
loading the document from a repository application comprising the repository.

3. The method of claim 1, wherein the document application is one selected from a group consisting of a spreadsheet application, a word processing application, a publishing application, a presentation application, and a form-based application.

4. The method of claim 1, wherein the dynamically created context menu is accessed by right-clicking on the selected data.

5. The method of claim 1, wherein the document type is one selected from a group consisting of an invoice, a purchase order, and an employee timesheet.

6. The method of claim 1, wherein the repository is located in a repository application, and wherein the repository application is business financial software.

7. A computing device for importing data into a repository, comprising:
a document loaded in a document application comprising data; and
a map file stored in a directory and configured to map data from the document to a plurality of fields in the repository, wherein the map file and the plurality of fields correspond to a document type of the document,
wherein the map file is used to dynamically create a context menu in the document by a macro specific to the document application, wherein the macro is dynamically inserted into the document application when the document is loaded and executes in response to selection of data to be imported from the document, and is configured to:
access the map file at the directory location stored in the repository,
determine the plurality of fields corresponding to the document type of the document from which data is imported from the map file, and
create the context menu in response to selection of data in the document, wherein the context menu is a user interface comprising the plurality of fields corresponding to the repository, and
wherein the selected data in the document is associated with one of the plurality of fields by selecting the one of the plurality of fields in the context menu, resulting in the importation of the selected data to the selected one of the plurality of fields in the repository,
wherein the selected data is copied to the map file, which acts as an intermediary storage file between the document and the repository, until the stored selected data is loaded from the map file into the repository at a later time, and
wherein a comment is inserted into the document by a user after importation to indicate that the selected data is imported into the repository.

8. The computing device of claim 7, further comprising:
a repository application configured as business financial software and configured to hold the repository.

9. The computing device of claim 8, wherein a link to the directory is stored in the repository application.

10. The computing device of claim 7, wherein the document application is one selected from a group consisting of a spreadsheet application, a word processing application, a publishing application, a presentation application, and a form-based application.

11. The computing device of claim 7, wherein the dynamically created context menu is accessed by right-clicking on the selected data.

12. The computing device of claim 7, wherein the document type is one selected from a group consisting of an invoice, a purchase order, and an employee timesheet.

13. A computer system comprising:
a processor;
a memory for storing a map file corresponding to a document type of a document, wherein the map file maps the document type of the document to a plurality of information fields for the document type stored in a repository to which at least one portion of data from the document is imported; and
a user interface rendered using the processor, comprising:
a document of the document type loaded in a corresponding document application, executed by the processor of the computer system, wherein the document comprises the at least one portion of data; and
a context menu comprising the plurality of information fields corresponding to the document type, wherein the content menu is dynamically created, in response to selection of the at least one portion of data in the document, by a macro specific to the document application which is dynamically inserted into the document application when the document is loaded and executes in response to the selection of data, and is configured to:

access the map file at the directory location stored in the repository, determine the plurality of information fields corresponding to the document type of the document from which data is imported from the map file, and create the context menu comprising the plurality of information fields, wherein the context menu is used to map the at least one portion of selected data to at least one of the plurality of information fields by selecting the at least one information field in the context menu, wherein, upon selection of the at least one information field in the context menu, the selected at least one portion of data is copied to the map file, which acts as an intermediary storage file between the document and the repository, until the stored selected at least one portion of data is loaded from the map file into the repository at a later time, and wherein a comment is inserted into the document by a user to indicate that the selected at least one portion of data is imported into the repository.

14. The computer system of claim 13, wherein the document type is one selected from a group consisting of an invoice, a purchase order, and an employee timesheet.

15. The computer system of claim 13, wherein the at least one portion of data is selected by highlighting the at least one portion of data.

16. The computer system of claim 15, wherein the context menu is invoked by right-clicking on the at least one portion of selected data.

17. A computer readable medium comprising computer readable program code embodied therein for causing a computer system to execute a method for importing data from a document to a repository, comprising steps to:

create a map file corresponding to a document type of the document, wherein the map file maps the document type of the document to a plurality of information fields stored in the repository for the document type;

store the map file in a directory and provide a location of the directory to the repository;

select data from the document;

create a macro for the document, wherein the macro is dynamically inserted into the document from which data is imported when the document is loaded from the repository, and wherein the macro is configured to:

access the map file at the directory location stored in the repository, determine the plurality of information fields corresponding to the document type of the document from which data is imported from the map file, and dynamically create a context menu, in response to the selection of data, comprising the plurality of information fields, wherein the context menu is a user interface that is created using the map file corresponding to the document type of the document;

map the selected data to one of the plurality of fields in the repository by selecting the one of the plurality of information fields displayed in the context menu, insert a comment into the document by a user importing the data, wherein the comment indicates that the selected data is imported into the repository; and import the selected data from the document to the selected information field in the repository using the map file, wherein the selected data is copied to the map file, which acts as an intermediary storage file between the document and the repository, until the stored selected data is loaded from the map file into the repository at a later time.

18. The computer readable medium of claim 17, further comprising computer readable program code embodied therein for causing a computer system to:

load the document from a repository application comprising the repository.

19. The computer readable medium of claim 18, wherein the document is loaded using a corresponding document application.

20. The computer readable medium of claim 19, wherein the corresponding document application is one selected from a group consisting of a spreadsheet application, a word processing application, a publishing application, a presentation application, and a form-based application.

21. A computer system, comprising:

a processor;

a memory;

a repository; and software instruction stored in the memory for enabling the computer system under control of the processor to:

create a map file corresponding to a document type of the document, wherein the map file maps the document type of the document to a plurality of information fields stored in the repository for the document type;

store the map file in a directory and provide a location of the directory to the repository;

select data from the document;

creating a macro specific to a document application in which the document is loaded, wherein the macro is dynamically inserted into the document from which data is imported when the document is loaded from the repository, and wherein the macro is configured to:

access the map file at the directory location stored in the repository, determine the information fields corresponding to the document type of the document from which data is imported from the map file, and dynamically create a context menu, in response to the selection of data, comprising the plurality of information fields, wherein the context menu is a user interface that is created using the map file corresponding to the document type of the document;

map the selected data to one of the plurality of fields in the repository by selecting the one of the plurality of information fields displayed in the context menu;

insert a comment into the document by a user importing the data, wherein the comment indicates that the selected data is imported into the repository; and import the selected data from the document to the selected information field in the repository using the map file, wherein the selected data is copied to the map file, which acts as an intermediary storage file between the document and the repository, until the stored selected data is loaded from the map file into the repository at a later time.

22. The computer system of claim 21, further comprising software instruction stored in the memory for enabling the computer system under control of the processor to:

load the document from a repository application comprising the repository.

23. The computer system of claim 21, wherein the document application is one selected from a group consisting of a spreadsheet application, a word processing application, a publishing application, a presentation application, and a form-based application.

* * * * *